United States Patent
Olver et al.

(10) Patent No.: US 10,364,700 B2
(45) Date of Patent: Jul. 30, 2019

(54) METHOD FOR FORMING A COMPOSITE PART OF A GAS TURBINE ENGINE

(71) Applicant: PRATT & WHITNEY CANADA CORP., Longueuil (CA)

(72) Inventors: Bryan W. Olver, Nobleton (CA); Stephen Caulfeild, Rockwook (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 561 days.

(21) Appl. No.: 15/194,956

(22) Filed: Jun. 28, 2016

(65) Prior Publication Data

US 2017/0370246 A1 Dec. 28, 2017

(51) Int. Cl.
*F01D 25/24* (2006.01)
*F01D 25/00* (2006.01)
(Continued)

(52) U.S. Cl.
CPC ............ *F01D 25/005* (2013.01); *B29B 13/02* (2013.01); *B29C 35/02* (2013.01); *B29C 65/02* (2013.01); *B29C 65/48* (2013.01); *B29C 66/1122* (2013.01); *B29C 66/532* (2013.01); *B29C 66/71* (2013.01); *B29C 66/7392* (2013.01); *B29C 66/7394* (2013.01); *B29C 66/73751* (2013.01); *B29C 66/73753* (2013.01); *B29C 66/73755* (2013.01); *B29C 66/73941* (2013.01); *F01D 17/105* (2013.01); *F01D 25/12* (2013.01); *F01D 25/18* (2013.01); *F01D 25/24* (2013.01); *F02C 7/14* (2013.01); *F02C 7/24* (2013.01); *B29C 65/5057* (2013.01); *B29C 66/7212* (2013.01); *B29C 2035/0283* (2013.01); *B29K 2063/00* (2013.01); *B29K 2071/00* (2013.01); *B29K 2105/06* (2013.01); *B29K 2307/04* (2013.01); *B29K 2309/08* (2013.01); *B29L 2031/7504* (2013.01); *F05D 2220/32* (2013.01); *F05D 2260/213* (2013.01);
(Continued)

(58) Field of Classification Search
None
See application file for complete search history.

(56) References Cited

U.S. PATENT DOCUMENTS

4,510,272 A   4/1985  Loszewski
5,021,519 A   6/1991  Varde et al.
(Continued)

*Primary Examiner* — Eldon T Brockman
(74) *Attorney, Agent, or Firm* — Norton Rose Fulbright Canada LLP (57) ABSTRACT

A method for forming a composite part of a gas turbine engine. The method includes assembling the composite part of a first composite material and a second composite material. The second composite material defines an outer surface of the composite part, and is selected to be curable at a cure temperature generated by heat from operation of the engine. The first composite material is selected to have an operating temperature limit less than the cure temperature. The method includes placing the composite part within the engine so that, in use, the second composite material is cured by exposure to the heat generated from operation of the engine. The second composite material thermally shields the first composite material from the heat generated from operation of the engine. The method includes operating the engine to cure the second composite material.

18 Claims, 4 Drawing Sheets

(51) Int. Cl.
  *B29B 13/02*  (2006.01)
  *B29C 35/02*  (2006.01)
  *B29C 65/48*  (2006.01)
  *F01D 17/10*  (2006.01)
  *F01D 25/12*  (2006.01)
  *F01D 25/18*  (2006.01)
  *B29C 65/00*  (2006.01)
  *B29C 65/02*  (2006.01)
  *F02C 7/14*  (2006.01)
  *F02C 7/24*  (2006.01)
  *B29K 63/00*  (2006.01)
  *B29K 71/00*  (2006.01)
  *B29K 105/06*  (2006.01)
  *B29K 307/04*  (2006.01)
  *B29K 309/08*  (2006.01)
  *B29L 31/00*  (2006.01)
  *B29C 65/50*  (2006.01)

(52) U.S. Cl.
  CPC ............... *F05D 2300/2102* (2013.01); *F05D 2300/224* (2013.01); *F05D 2300/603* (2013.01); *F05D 2300/614* (2013.01)

(56) References Cited

U.S. PATENT DOCUMENTS

| | | | |
|---|---|---|---|
| 5,141,804 A | 8/1992 | Riefler et al. | |
| 7,431,978 B2 * | 10/2008 | Blanton | B29C 70/465 428/292.1 |
| 8,753,094 B2 | 6/2014 | Bottome | |
| 9,132,591 B2 * | 9/2015 | Adamse | B29C 70/443 |
| 2006/0134396 A1 * | 6/2006 | Blanton | B29C 70/465 428/292.1 |
| 2013/0287589 A1 * | 10/2013 | Adamse | B29C 70/443 416/241 A |
| 2014/0309352 A1 | 10/2014 | Ward et al. | |

* cited by examiner

METHOD FOR FORMING A COMPOSITE PART OF A GAS TURBINE ENGINE

TECHNICAL FIELD

The application relates generally to composite materials and, more particularly, to composite materials for gas turbine engines.

BACKGROUND OF THE ART

Composite materials can be used in various components of a gas turbine engine. Some composite materials have a relatively low operating temperature limit. This prevents them from being used in hotter sections of the engine unless the composite material is thermally protected. Applying or integrating thermal protection to the composite material can be expensive, may not allow for inspection of the underlying composite material part, and/or may impose a weight penalty.

SUMMARY

In one aspect, there is provided a method for forming a composite part of a gas turbine engine, comprising: assembling the composite part of at least a first composite material and a second composite material, the second composite material disposed to overlay a portion of the first composite material to define an outer surface of the composite part, the second composite material selected to be curable at a cure temperature generated by heat from operation of the engine in a vicinity of the engine in which the composite part is installed, the first composite material selected to have an operating temperature limit less than the cure temperature of the second composite material; placing the composite part within the engine so that, in use, the second composite material defining the outer surface of the composite part is cured by exposure to the heat generated from operation of the engine, the second composite material thermally shielding the first composite material from the heat generated from operation of the engine; and operating the engine to cure the second composite material.

In another aspect, there is provided a method for curing a composite part in a gas turbine engine, comprising: placing a pre-assembly of the composite part in the gas turbine engine, the pre-assembly having at least a cured first composite material and a second composite material disposed to overlay a portion of the first composite material to define an outer surface of the composite part, the second composite material defining the outer surface of the composite part selected to be curable at a cure temperature generated by heat from operation of the engine in a vicinity of the engine in which the pre-assembly is installed, the first composite material selected to have an operating temperature limit less than the cure temperature of the second composite material; and operating the engine to cure only the second composite material, the second composite material thermally shielding the first composite material from the heat generated from operation of the engine.

In a further aspect, there is provided an outer bypass duct wall of a gas turbine engine, comprising: a recess in the bypass duct wall along an inner surface thereof having an oil cooler disposed therein, the recess being defined by at least a first layer made of a first composite material, and a second layer made of a second composite material, the second layer disposed to overlay at least part of the first layer between the first layer and the oil cooler to thermally shield the first layer from heat generated by the oil cooler during operation of the gas turbine engine, the second composite material of the second layer having an operating temperature limit being greater than an operating temperature limit of the first composite material of the first layer.

DESCRIPTION OF THE DRAWINGS

Reference is now made to the accompanying figures in which.

DETAILED DESCRIPTION

Figure 1:
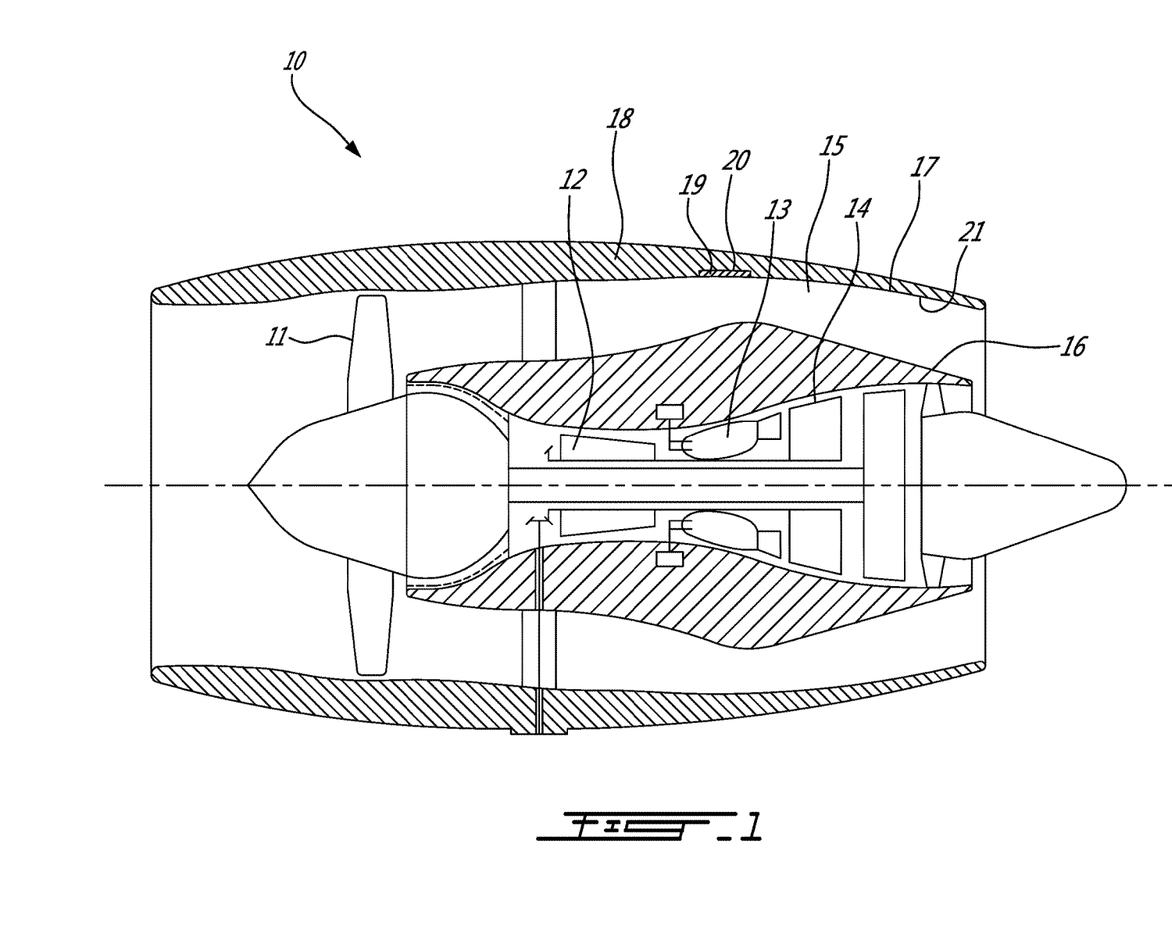
FIG. 1 is a schematic cross-sectional view of a gas turbine engine.

FIG. 1 illustrates a gas turbine engine 10 of a type preferably provided for use in subsonic flight, generally comprising in serial flow communication a fan 11 through which ambient air is propelled, a compressor section 12 for pressurizing the air, a combustor 13 in which the compressed air is mixed with fuel and ignited for generating an annular stream of hot combustion gases, and a turbine section 14 for extracting energy from the combustion gases. An annular bypass duct 15 is defined between an inner bypass duct wall 16 and an outer bypass duct wall 17. A stream of bypass air which is compressed by the fan 11 is directed through the annular bypass duct 15 and discharged therefrom to produce thrust.

The outer bypass duct wall 17 is defined by an annular body 18. In the depicted embodiment, a fluid cooler, in this example an oil cooler 19, is disposed within a recess 20 of the annular body 18. The recess 20 extends inwardly along an inner surface 21 of the annular body 18 to define a cavity in which the oil cooler 19 can be received. The oil cooler 19 is preferably sealingly mounted to the outer bypass duct wall 17 in the recess 20. Relatively hot oil flowing through the passages of the oil cooler 19 is thus permitted to engage in heat exchange with the fast moving stream of bypass air passing through the annular bypass duct 15, to cool the oil.

Figure 2A:
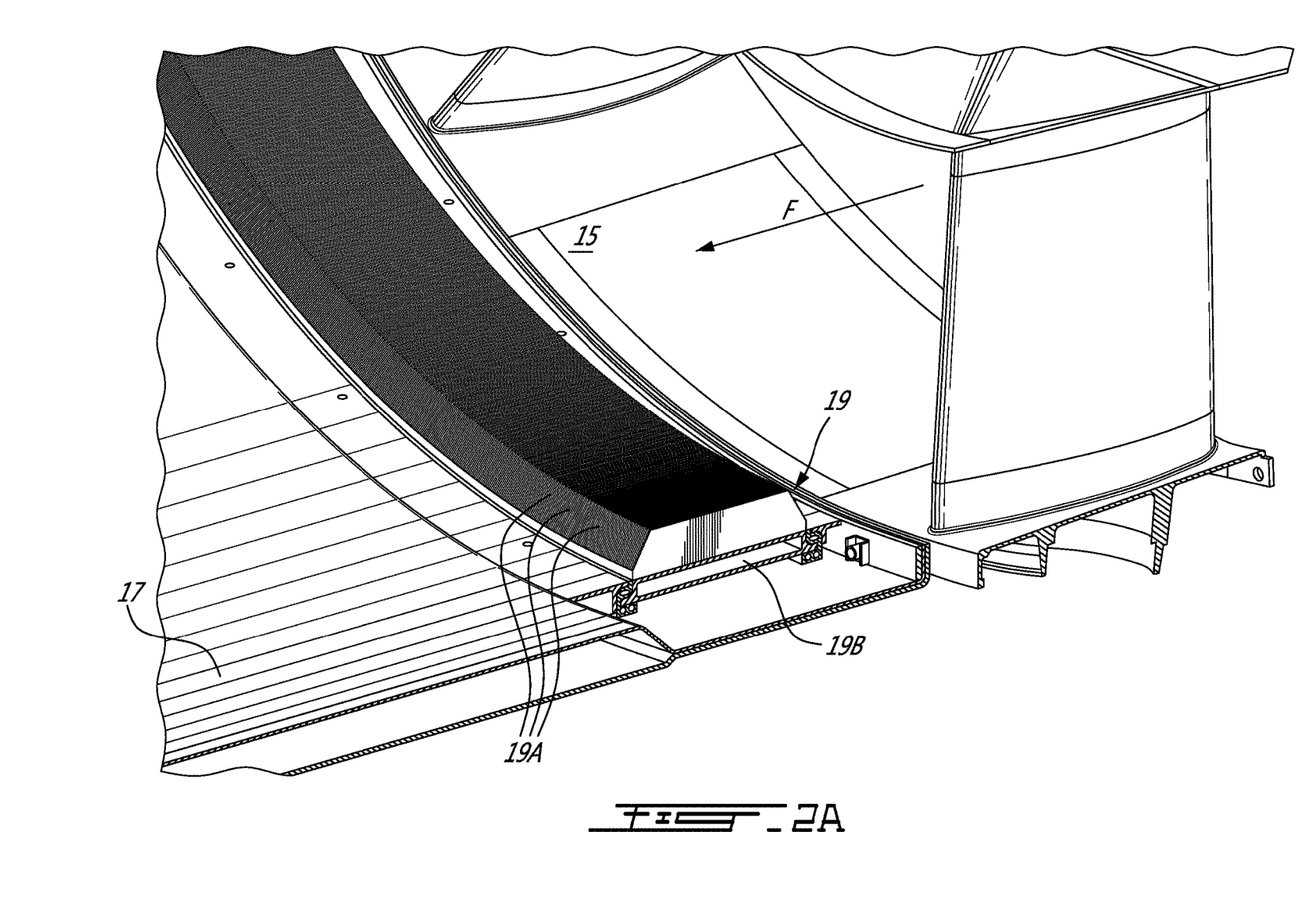
FIG. 2A is a perspective view of an outer bypass duct of the gas turbine engine of FIG. 1, the outer bypass duct having an oil cooler disposed within a recess thereof.
Figure 2B:
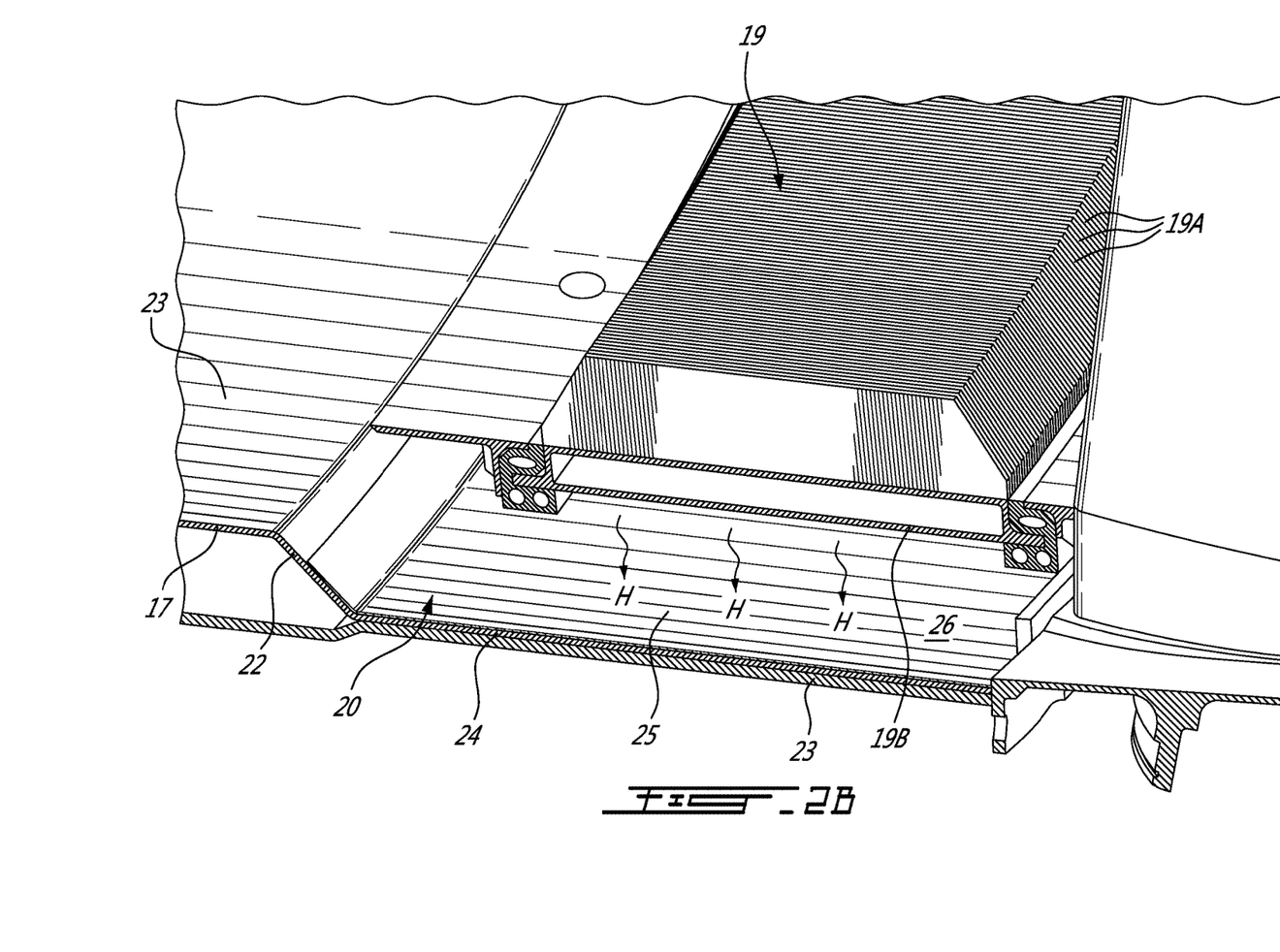
FIG. 2B is an enlarged view of the recess and oil cooler of FIG. 2A.

FIGS. 2A and 2B provide additional views of the oil cooler 19, according to an embodiment thereof. The oil cooler 19 has multiple air fins 19A which are exposed to the cooling air flow F flowing through the bypass duct 15. The cooling air flow F flowing through the air fins 19A exchanges heat with relatively hot oil flowing through the hot oil passage 19B. The relatively hot oil is therefore cooled by the cooling air flow F as the oil travels through the hot oil passage 19B. The oil cooler 19 in the depicted embodiment radiates and/or convects heat away from the bypass duct 15 and towards the outer bypass duct wall 17. More particularly, heat absorbed by the oil cooler 19 from the relatively hot oil flowing in the hot oil passage 19B radiates and/or convects toward the outer bypass duct wall 17 as shown by H. As will be explained in greater detail below, this heat can be used to cure a composite material.

Some or all of the outer bypass duct wall 17 is made of composite materials. In the depicted embodiment, at least the recess 20 in the outer bypass duct wall 17 is defined by a first layer 22 made of a first composite material 23, and a second layer 24 made of a second composite material 25. At least the structure defining the recess 20 in the outer bypass duct wall 17 is therefore a composite part of the gas turbine engine that is integrally formed from the first and second composite materials 23,25, as explained in greater detail below.

The first and second layers 22,24 can consist of one or more plies of their respective first and second composite materials 23,25. The manner in which the first and second layers 22,24 are combined and/or the properties of their composite materials 23,25, affect the properties of the integral composite part recess 20. In the depicted embodiment, the second composite material 25 has a higher operating temperature limit than the first composite material 23. The operating temperature limit is the temperature past which the fibers and/or resin of the composite material will begin to degrade. The higher operating temperature limit of the second composite material 25 allows it to therefore withstand higher temperatures than the first composite material 23. Therefore, layering the higher operating temperature limit second layer 24 over at least part of the first layer 22, such that the second layer 24 is positioned between the first layer 22 and the oil cooler 19, will form a thermal barrier between the first layer 22 and the oil cooler 19. The second layer 24 therefore is configured to thermally shield the first layer 22 from the heat generated by the oil cooler 19 when the engine is in operation.

The second layer 24 therefore defines an outer surface 26 of the composite part recess 20. The outer surface 26 is exposed to the source of heat generated by the gas turbine engine (i.e. heat from the oil cooler 19, in the depicted embodiment). As will be explained in greater detail below, the exposed outer surface 26 uses heat from the heat source to be applied to cure the second composite material 25 of the second layer 22, thereby helping to form the composite part recess 20.

In the depicted embodiment, the first composite material 23 includes a carbon fiber epoxy, or CFE. CFE is a carbon fiber reinforced polymer which contains carbon fibers bound together by an epoxy thermoset resin. One technique for producing a CFE composite part involves layering sheets or plies of carbon fiber cloth into a mold into a desired shape, for example such as that of the final composite part. The alignment and weave of the carbon fibers may be selected to optimize the strength and stiffness properties of the resulting composite part. The mold is then filled with the epoxy resin and heated under pressure to cure the epoxy resin and solidify the composite part. The resulting part is corrosion-resistant, stiff, and strong for its weight. Other techniques for making the CFE composite part may also be used. For example, the epoxy resin can be pre-impregnated (known as "pre-preg") into the carbon fibers. CFE is relatively strong and light, and can be manipulated relatively easily to manufacture composite parts having complex shapes. However, CFE has a relatively low operating temperature limit of about 250° F. Above this temperature, the structural integrity of the epoxy resin and/or carbon fibers may begin to weaken, making non-thermally insulated CFE composite parts unsuitable for higher temperature applications.

In the depicted embodiment, the second composite material 25 includes glass fiber bismaleimide (BMI) or carbon fiber Polyether ether ketone (PEEK). BMI and PEEK are thermosetting resins that bind the fibers together. BMIs and PEEKs have higher glass transition temperatures than epoxies, and withstand thermal ageing relatively well. Similarly to epoxies, BMIs and PEEKs are relatively easy to manipulate to create structural components. BMI and PEEK composite materials can therefore complement majority epoxy composite parts that operate at temperatures that are greater than the capability of epoxy resins.

Although the composite materials most often discussed herein are CFE, glass fiber BMI, and carbon fiber PEEK, it will be appreciated that the first and second composite materials 23,25 can include other composite materials as well. For example, the first composite material 23 can be any composite material which provides suitable structural properties for the composite part, and the second composite material 25 can be any suitable composite material which provides thermal shielding to the underlying first composite material 23. The expression "thermal shielding" refers to the ability of the second composite material 25 to thermally protect the first composite material 23 by impeding heat from the heat source from being transferred to first composite material 23. Thermal shielding can include, but is not limited, thermally insulating the first composite material. The first and second composite materials are different from one another. They are distinguished primarily, but not exclusively, by the resin matrix used to bind their fibers, their operating temperature limits, and their glass transition temperature.

It has conventionally proven difficult to combine structural CFE with a glass fiber BMI or carbon fiber PEEK to form an integrated composite part for a gas turbine engine that can withstand higher operating temperatures than CFE alone. It has been observed that the epoxy resin of the CFE is dissimilar to the BMI and PEEK resins, making them incompatible for some structural applications. It has therefore proven difficult to make an integrated, structural composite part from these non-like resins.

Figure 3:
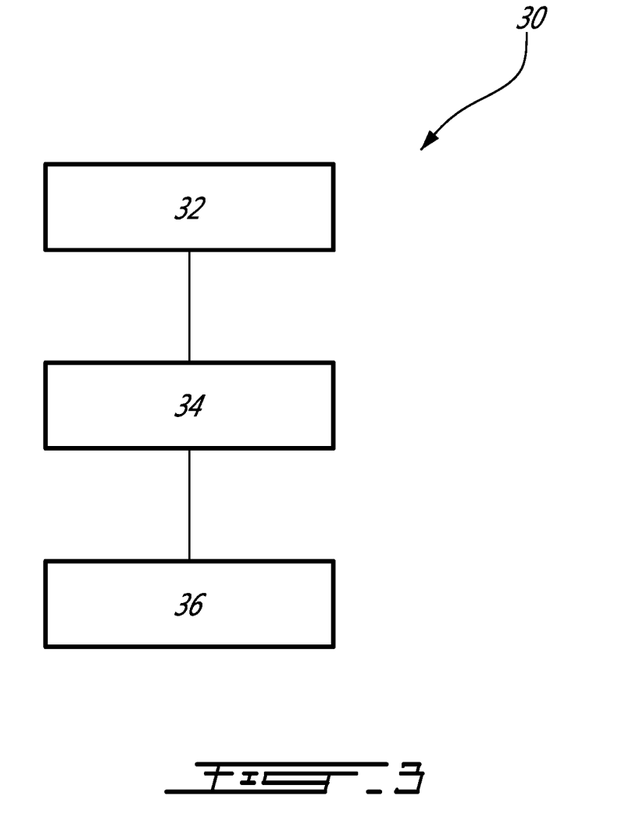
FIG. 3 is a flow diagram of a method for forming a composite part of a gas turbine engine, according to an embodiment of the present disclosure.

Referring to FIG. 3, there is disclosed a method 30 for forming a composite part of a gas turbine engine. The method 30 disclosed herein relates to the combining or joining of normally incompatible resin systems and/or composite materials. The method 30 therefore results in the formation of a new or "hybrid" composite part composed of at least two normally incompatible resin systems. The resulting composite part can be used in any suitable section of the gas turbine engine, and is not limited to the composite recess in the outer bypass duct wall described above.

The method 30 includes assembling the composite part from at least the first composite material and the second composite material, represented by reference number 32 in FIG. 3. The first and second composite materials can be assembled in any suitable fashion (e.g. lay-up, adhesive, abutting, etc.) that results in physical contact between the composite materials. The first and second composite materials are assembled such that the second composite material is laid on some portion, or all, of the first composite material. The composite part disclosed herein can be an all-composite part, meaning that it has no metal components or structure. Therefore, assembling the first and second composite materials may include assembling the second composite material made entirely of one of a glass fiber BMI and a carbon fiber PEEK.

In one possible technique, assembling the composite part includes shaping the first composite material into a desired shape, such as that of the composite part. For example, where the first composite material includes CFE, the CFE can be molded into the desired shape. When demolded, the CFE will have the desired shaped and structural properties. Shaping the first composite material may also include pre-curing the first composite material before the step 32 of assembling the composite part. The pre-curing helps to stiffen the CFE and reduces the likelihood of comingling with other incompatible resins. The composite part therefore includes a cured first composite material, and an uncured second composite material. Such a structure defines an initial, pre-assembly of the composite part.

In another possible technique, assembling the composite part includes layering one or more plies of the second composite material onto a mandrel of a mold, placing a buffer material over the second composite material, applying a film adhesive to the buffer material, and layering at least one ply of the first composite material over the film adhesive. For example, where the first composite material includes CFE and where the second composite material includes glass fiber BMI, this technique includes layering one or more plies of the glass fiber BMI on the mandrel. The buffer material can be a dry glass cloth that is layered on the glass fiber BMI, and is then followed by a supported film adhesive. The one or more plies of CFE are then layered onto the film adhesive. As will be explained in greater detail below, the glass cloth and supported film adhesive define a resin intermixing buffer zone, and thus separate the epoxy resin from the BMI resin. This helps to impede the epoxy resin from being contaminated by the BMI resin.

The method 30 may also include heating the first and second composite materials to a first temperature to cure the first composite material. Heating may be required to join the first and second composite materials together in the pre-assembly before the final cure which results in the formation of the composite part. Heating to the first temperature may be performed in an autoclave which receives the first and second composite materials. Heating may include heating the first and second composite materials to a relatively high cure temperature that exceeds the operating temperature limit of the first composite material. For example, heating the first and second composite materials may include heating the first composite material to cure it at the first temperature of about 350° F., which is above the operating temperature limit for CFE of about 250° F. Indeed, it is understood that curing the first composite material at a relatively high temperature allows it to obtain a relatively high operating temperature of 250° F. Once the heating process has been completed, the first composite material is hardened and its polymer chains are cross-linked. Heating the second composite material to the first temperature achieves an initial cure of the second composite material. The initial cure of the second composite material does not provide it with an operating temperature limit that is greater than that of the first composite material. The second composite material will acquire this higher operating temperature limit after a secondary cure, to be performed by the engine.

Depending on the resins of the first and second composite materials, it may be necessary to impede one resin from being contaminated by another. Therefore, the method may include impeding the resin of the first composite material from mixing with the resin of the second composite material. Impeding the resins from intermixing may be facilitated by the creation of the resin intermixing buffer zone. The buffer zone facilitates the joining of two normally incompatible composite materials into a single composite part by impeding the dissimilar resins from mixing when they are both heated in a single curing operation. The buffer zone may be formed by applying a film adhesive between the first and second composite materials. For example, in the embodiment where the composite part defines the recess in the outer bypass duct wall, the recess can be covered with a film adhesive, and the glass fiber BMI prepreg second composite material can be layered over the CFE first composite material in the appropriate number of layers (e.g. three layers, each having a thickness of roughly 0.0034 in.). The number of layers of the second composite material, as well as their thickness, can be chosen depending on the desired level of thermal shielding, or insulation, of the first composite part. The buffer zone may alternatively be formed by placing a dry glass cloth and applying a film adhesive between the first and second composite materials.

The method 30 also includes placing composite part, which may consist of the alreadycured first composite material and the uncured second composite material, within the gas turbine engine, represented by reference number 34 in FIG. 3. The second composite material at least partially overlies the first composite material, and thus defines the outer surface of the composite part that is exposed to heat generated during operation of the gas turbine engine. It can thus be appreciated that step 34 includes placing a pre-assembly of the composite part to be formed into the gas turbine engine in a location of the gas turbine engine that is in the vicinity of the source of heat. The pre-assembly is an already assembled, partially-cured, version of the composite part to be formed.

Although the heat source is described herein as an oil cooler, it will be appreciated that the heat source can be another source of heat generated during operation of the gas turbine engine. For example, the source of heat may be derived from the relatively hot gases generated by the fan or compressor, from the engine exhaust, from a bleed air valve or pipe, or any other suitable source. It can thus be appreciated that the second composite material is in closer proximity to the heat source than the first composite material. In overlaying at least part of the underlying structural first composite material, the second composite material thermally shields the first composite material from the heat source. The overlying second composite material therefore protects the first composite material, at least partially, from exposure to the heat source, which may generate temperatures above the operating temperature limit of the first composite material.

The method 30 also includes operating the gas turbine engine to cure the second composite material, represented by reference number 36 in FIG. 3. The second composite material is cured at a cure temperature with the heat generated during operation of the gas turbine engine. This curing operation represents a secondary or "post-cure" procedure because the second composite material, having previously been initially cured, is cured again. After being cured a second time, the second composite material acquires its relatively high operating temperature limit of about 350° F. in the case of BMI, which is greater than that of the first composite material. As explained above, the first composite material is thermally shielded by the second composite material. The first composite material will therefore not be affected by the exposure of the pre-assembly to the heat source at the cure temperature, which is greater than the operating temperature limit of the first composite material. It can thus be appreciated that the higher operating temperature limit of the second composite material effectively increases the operating temperature limit of the composite part as a whole, allowing it to be used in higher temperature applications. Using the composite part in such higher temperature applications would not be possible if the composite part included only the first composite material. This post-curing by the gas turbine engine of the pre-assembly completes the formation of the composite part.

In an embodiment, operating the gas turbine engine to cure the second composite material includes curing it during the first start-up of the gas turbine engine. The initial operation of the gas turbine engine may generate the heat required to cure the second composite material. Subsequent operations of the gas turbine engine at or above the cure temperature should not affect the second composite material, provided that temperatures exceeding the operating temperature limit of the second composite material are not generated.

In the embodiment where the first composite material includes CFE and where the second composite material includes glass fiber BMI or carbon fiber PEEK, the BMI or PEEK of the composite part face the relatively hot source of heat and thermally shields the CFE. The BMI or PEEK is cured during this second cure cycle at a cure temperature of less than 350° F. (i.e. the operating temperature limit for BMI), but above 250° F. (i.e. the operating temperature limit for CFE). Preferably, the cure temperature is about 325° F. The BMI or PEEK therefore receives a local cure from the gas turbine engine.

In light of the preceding, it can be appreciated that the method 30 disclosed herein allows, at least in some embodiments, for incorporating normally-incompatible resin systems to create a composite part for use at elevated temperatures.

Indeed, one of the disclosed embodiments describes an outer bypass duct (OBPD) composed primarily of a first composite material including CFE. The CFE provides the structural properties required for the application. Glass reinforced BMI plys, or thermoformed high temp PEEK, the second composite material, is combined with a portion of the CFE because of the higher operating temperatures limits of BMI and PEEK, along with improved insulating properties which further thermally protect the underlying structural CFE. The BMI or PEEK can be either integrally molded with the epoxy layup, or can be integrated with an already molded CFE part, thereby eliminating the need for additional thermal protection (i.e. metal, coatings, insulating blankets, etc.). For example, the second composite material can be fully pre-cured BMI flat or curved strips, which are subsequently adhesively bonded into the CFE assembly. Similarly, the second composite material can include thermoformed high temp glass reinforced PEEK flat or curved strips that are adhesively bonded into the CFE assembly.

The method 30 disclosed herein therefore provides a technique, in at least some embodiments, to cure dissimilar resin systems to create a composite part that can withstand higher operating temperatures in local areas.

Thermal protection of the underlying first composite material is thus provided by the composite part itself, rendering unnecessary conventional thermal protections (metal ducts, insulating blankets, expandable coatings, etc.) for the underlying structural first composite material. The lack of conventional thermal protections helps to reduce the overall weight of the composite part and to reduce the complexity of its manufacture.

Furthermore, it may be easier to visually inspect the composite part compared to when it is covered with a metallic thermal shield. The all-composite part is thus more easily inspected than a metal-shielded part.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A method for forming a composite part of a gas turbine engine, comprising:
    assembling the composite part of at least a first composite material and a second composite material, the second composite material disposed to overlay a portion of the first composite material to define an outer surface of the composite part, the second composite material selected to be curable at a cure temperature generated by heat from operation of the engine in a vicinity of the engine in which the composite part is installed, the first composite material selected to have an operating temperature limit less than the cure temperature of the second composite material;
    placing the composite part within the engine so that, in use, the second composite material defining the outer surface of the composite part is cured by exposure to the heat generated from operation of the engine, the second composite material thermally shielding the first composite material from the heat generated from operation of the engine; and
    operating the engine to cure the second composite material.

2. The method as defined in claim 1, wherein the step of assembling the composite part includes heating the first and second composite materials to a first temperature to cure the first composite material before placing the composite part within the engine.

3. The method as defined in claim 2, wherein the first temperature is greater than the operating temperature limit of the first composite material.

4. The method as defined in claim 1, wherein the step of operating the engine to cure the second composite material includes operating the engine to post cure the second composite material after curing the second composite material.

5. The method as defined in claim 2, wherein the step of heating the first and second composite materials includes impeding a resin of the first composite material from mixing with a resin of the second composite material.

6. The method as defined in claim 5, wherein the step of impeding the resin of the first composite material from mixing with the resin of the second composite material includes applying a film adhesive between the first and second composite materials.

7. The method as defined in claim 5, wherein the step of impeding the resin of the first composite material from mixing with the resin of the second composite material includes placing a buffer material and applying a film adhesive between the first and second composite materials.

8. The method as defined in claim 1, wherein the step of assembling the composite part includes shaping the first composite material before assembling the composite part.

9. The method as defined in claim 1, wherein the step of assembling the composite part includes curing the first composite material before assembling the composite part.

10. The method as defined in claim 1, wherein the step of assembling the composite part includes layering the second composite material onto a mandrel of a mold, placing a buffer material over the second composite material, applying a film adhesive to the buffer material, and layering at least one ply of the first composite material over the film adhesive.

11. The method as defined in claim 1, wherein the step of operating the engine to cure the second composite material includes operating the engine to cure the second composite material during a start-up of the engine.

12. The method as defined in claim 1, wherein the step of assembling the composite part includes assembling a carbon fiber epoxy first composite material with one of a glass fiber bismaleimide and a carbon fiber Polyether ether ketone second composite material.

13. The method as defined in claim 1, wherein the step of assembling the composite part includes assembling the second composite material being made entirely of one of a glass fiber bismaleimide and a carbon fiber Polyether ether ketone.

14. A method for curing a composite part in a gas turbine engine, comprising:

placing a pre-assembly of the composite part in the gas turbine engine, the pre-assembly having at least a cured first composite material and a second composite material disposed to overlay a portion of the first composite material to define an outer surface of the composite part, the second composite material defining the outer surface of the composite part selected to be curable at a cure temperature generated by heat from operation of the engine in a vicinity of the engine in which the pre-assembly is installed, the first composite material selected to have an operating temperature limit less than the cure temperature of the second composite material; and operating the engine to cure only the second composite material, the second composite material thermally shielding the first composite material from the heat generated from operation of the engine.

15. The method as defined in claim 14, wherein the step of operating the engine to cure only the second composite material includes operating the engine to cure the second composite material during a start-up of the engine.

16. The method as defined in claim 14, wherein the step of placing the pre-assembly includes assembling a carbon fiber epoxy first composite material with one of a glass fiber bismaleimide or a carbon fiber Polyether ether ketone second composite material.

17. The method as defined in claim 14, wherein the step of placing the pre-assembly of the composite part includes assembling the second composite material being made entirely of one of a glass fiber bismaleimide and a carbon fiber Polyether ether ketone.

18. The method as defined in claim 14, wherein the step of placing the pre-assembly includes heating the first and second composite materials to a first temperature to cure the first composite material before placing the pre-assembly within the engine, the first temperature being greater than the operating temperature limit of the first composite material.

\* \* \* \* \*